United States Patent
Saulters et al.

(10) Patent No.: US 8,921,716 B2
(45) Date of Patent: Dec. 30, 2014

(54) PLURALITY OF SCALES THAT COMMUNICATE WITH EACH OTHER AND INDICATE WHICH SCALE HAS THE LIGHTEST LOAD ATTACHED THERETO

(76) Inventors: Scott W. Saulters, Ben Wheeler, TX (US); John Maxfield, Van, TX (US); Todd Collins, Lindale, TX (US)

(*) Notice: Subject to any disclaimer, the term of this patent is extended or adjusted under 35 U.S.C. 154(b) by 288 days.

(21) Appl. No.: 13/342,717

(22) Filed: Jan. 3, 2012

(65) Prior Publication Data

US 2013/0168161 A1    Jul. 4, 2013

(51) Int. Cl.
- G01G 19/414    (2006.01)
- G01G 19/415    (2006.01)
- G01G 21/28     (2006.01)
- G08B 1/08      (2006.01)
- G01G 23/36     (2006.01)

(52) U.S. Cl.
USPC .................. 177/25.13; 177/148; 177/200

(58) Field of Classification Search
USPC ............... 177/131, 148, 149, 199, 200, 25.13
See application file for complete search history.

(56) References Cited

U.S. PATENT DOCUMENTS

| | | | |
|---|---|---|---|
| 4,643,267 A * | 2/1987 | Southern et al. | 177/190 |
| 4,753,031 A * | 6/1988 | Owen | 43/54.1 |
| 5,545,855 A * | 8/1996 | Stanfield et al. | 177/25.13 |
| 5,979,752 A * | 11/1999 | Holloway | 235/90 |
| 6,222,449 B1 * | 4/2001 | Twining | 340/539.11 |
| 6,603,082 B1 * | 8/2003 | Delbruck et al. | 177/132 |
| 6,608,261 B2 * | 8/2003 | Thadani | 177/126 |
| 6,875,932 B2 * | 4/2005 | Tuft | 177/25.13 |
| 7,173,197 B1 * | 2/2007 | Kasperek | 177/131 |
| 8,136,719 B2 * | 3/2012 | Shores | 235/61 R |
| 8,263,881 B2 * | 9/2012 | Oseko | 177/25.13 |
| 2003/0127253 A1 * | 7/2003 | Heyn | 177/148 |

* cited by examiner

Primary Examiner — Randy W Gibson
(74) Attorney, Agent, or Firm — James R. Gourley; Carstens & Cahoon, LLP

(57) ABSTRACT

The present invention is a weighing scale and system of weighing scales used to weigh a group of loads and determine which load is the lightest so it can be culled from the group. The weighing scales are most useful for use in fishing tournaments to ensure an angler has possession of the maximum total weight of fish possible.

11 Claims, 13 Drawing Sheets

PLURALITY OF SCALES THAT COMMUNICATE WITH EACH OTHER AND INDICATE WHICH SCALE HAS THE LIGHTEST LOAD ATTACHED THERETO

BACKGROUND OF THE INVENTION

Sea creatures, and in particular fish, which are found in various bodies of water such as lakes, ponds, rivers, and streams as well as the sea, have been essential to the sustainability of life for mankind. Humans have utilized devices such as fishing poles and/or fishing nets to capture and remove fish from their natural habitats. After removal, the fish can be consumed as food. Additionally, fish are a vital part of the cycle of life for organisms that inhabit the water and air. As such, fish not only aid in the proper functioning of the ecosystem, but also provide sustenance and nourishment as food for mankind Therefore, fish serve various useful purposes and functions.

Over the centuries, the art and science of catching fish, which is known as fishing, has evolved into a sport that is both entertaining and fun for participants and spectators alike. In every country around the world, fishing tournaments are held and games are played that employ a form of fishing. While each fishing tournament or fishing game has its own particular set of objectives and rules, generally the primary objective of such a tournament or game involves catching the heaviest fish, or heaviest group of fish, within a certain predetermined amount of time. Moreover, such game or tournament rules may dictate that each fisherman (who are sometimes referred to as anglers) may only possess, at most, a certain number of fish at any one time during the game or tournament.

A fish culling tournament is one example of a fishing tournament that utilizes some of the aforementioned rules. In a fish culling tournament, tournament rules generally mandate that no more than two anglers can be positioned on a particular boat or particular pier. As such, each boat launching from shore may carry, at most, two anglers. Usually after launching, each boat navigates to a different area of the body of water. Within each boat is a live well that holds the fish that are caught by each angler during the tournament. After an angler catches a fish with a fishing pole or other like device, the angler may place the fish in a live well. The live well functions as a holding tank for fish that are captured by the angler. The live well may be partially or completely filled with water, allowing the captured fish to breathe and swim therein.

Generally, the primary objective during a fish culling tournament is to catch as many fish as possible within a set amount of time while only keeping, at most, a set number of fish in a live well at any one time. To win the tournament, an angler, within the set amount of time, must catch and have in possession no more than a maximum number of fish that have a greater combined weight than the combined weight of each group of fish caught and possessed by other tournament participating anglers. While fish culling tournament rules vary from tournament to tournament, generally tournament rules provide eight hours as the time limit and five fish as the number of fish.

For purposes of this disclosure, the subsequent discussion and examples will apply the typical eight hours as the time limit and five fish as the maximum number of fish. However, it should be noted that these constraints are provided herein for illustration and example purposes only and thus do not limit this disclosure. Therefore applying the example constraints given above, an angler can win a fish culling tournament by catching and possessing, at most, five fish by the eighth hour of tournament play that have a greater combined total weight than combined total weight of the five fish caught and possessed by the other tournament participating anglers.

At the beginning of a fish culling tournament, the participating anglers will usually spread out over of a body of water. During the tournament, some anglers may prefer to fish from a pier or other similar stationary object. However, fishing from a boat is typically the preferred choice. Fish culling tournament rules generally allow for only two anglers per boat. After the anglers board their respective boats, the boats are moved into position and the fishing begins.

During the tournament, anglers utilize standard fishing devices to catch fish such as a fishing pole, rod, line, hook and/or lure. When a fish is caught, an angler removes that particular fish from the fishing device and deposits it into a live well. This process is repeated until the maximum number of fish allowed by tournament rules is caught, which as disclosed herein as an example is the fifth fish, and placed in the live well. Once maximum number of fish allowed plus one is caught, which as disclosed herein as an example is the sixth fish, the angler must choose which individual fish among the fish in the live well and the newly caught fish weighs the least. After the angler has chosen the lightest weight fish, it is culled and thrown back into the body of water. Therefore, if the fish having the lightest weight is the newly caught fish, then the newly caught fish is thrown back into the body of water, the fish contained in the live well are kept, and the angler attempts to catch another fish. If, however, the fish having the lightest weight is within the live well, then that particular fish is removed from the live well and thrown back into the body of water, and replaced by the newly caught fish. In sum, the angler must compare the weight of the newly caught fish to the weight of each individual fish contained in the live well. The individual fish that weighs the least must be tossed back into the body of water if the angler hopes to win the tournament. This process is employed for each fish caught after the maximum number of fish allowed for the tournament (for example, the fifth fish) has been caught and placed within the live well.

At the conclusion of the tournament, each participating angler should have the five heaviest fish caught by that angler during the tournament in the live well. Tournament officials determine the total weight of fish in each angler's live well by combining the weight of all fish therein. The participating angler with the highest total weight of the five fish in the live well wins the tournament.

To have the best chance at winning the tournament, anglers must quickly and correctly cull fish. If anglers do not perform the culling process in a quick and accurate manner, they risk underperforming in the tournament. Therefore, quickness, agility and accuracy are important factors for winning in fish culling tournaments.

Decreasing the amount of time that an angler expends in culling fish during the tournament increases the amount of time that the angler can spend fishing. This, in turn, increases the probabilities that an angler will have larger and heavier fish in the live well at the completion of the tournament. Conventional and known fish culling apparatuses do not allow the angler to efficiently determine which fish to cull from the group. Using conventional apparatuses and methods, a portion of an angler's time during the tournament is expended in weighing each fish that is caught, manually recording the weight of each fish, and comparing the weight of each fish one to another. In doing so, an angler is usually able to cull the correct fish. However during known culling procedures, significant time is diverted away from catching fish, which, in turn, reduces the probabilities that an angler will have the heaviest fish in the live well at the completion of the tournament.

Furthermore, known culling procedures can produce to inaccurate results more often than desired. For example, an angler may cull the wrong fish due to mistakes in the angler's recording system. Specifically, the angler may record an incorrect weight of a fish, incorrectly associate a particular fish with a particular weight, or make some other incorrect entry into a recording system. These and additional errors can result in the incorrect culling of fish, thereby reducing the angler's chances of winning the tournament.

SUMMARY OF THE INVENTION

The present invention is a weighing scale system, apparatus, and method of use. In one embodiment, the weighing system of the present invention comprises a plurality of weighing scales, each weighing scale having the ability to measure the weight of a load attached thereto, each weighing scale capable of electronically communicating with every other weighing scale in use, determining which weighing scale in use is attached to the load having the lowest weight, and alerting a user when a load attached thereto is lower in weight than all other loads. In other embodiments, the weighing scales can comprise one or more of the following features: an indicator light, a display screen, the ability to communicate wirelessly with other weighing scales or an electronic device, which in one embodiment can be chosen from a mobile telephone, a personal digital assistant, a digital display device, a computer, a depth finder, and a fish finder.

In another embodiment, the present invention is a weighing scale comprising a gripping surface, an attachment member capable of receiving a load, and a weight sensor capable of measuring a weight for said load, wherein said weighing scale is buoyant in water and can communicate with other weighing scales. In other embodiments, the weighing scale can comprise one or more of the following features: a display screen, an indicator light, a battery, or a rechargeable battery.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE INVENTION

Figure 1:
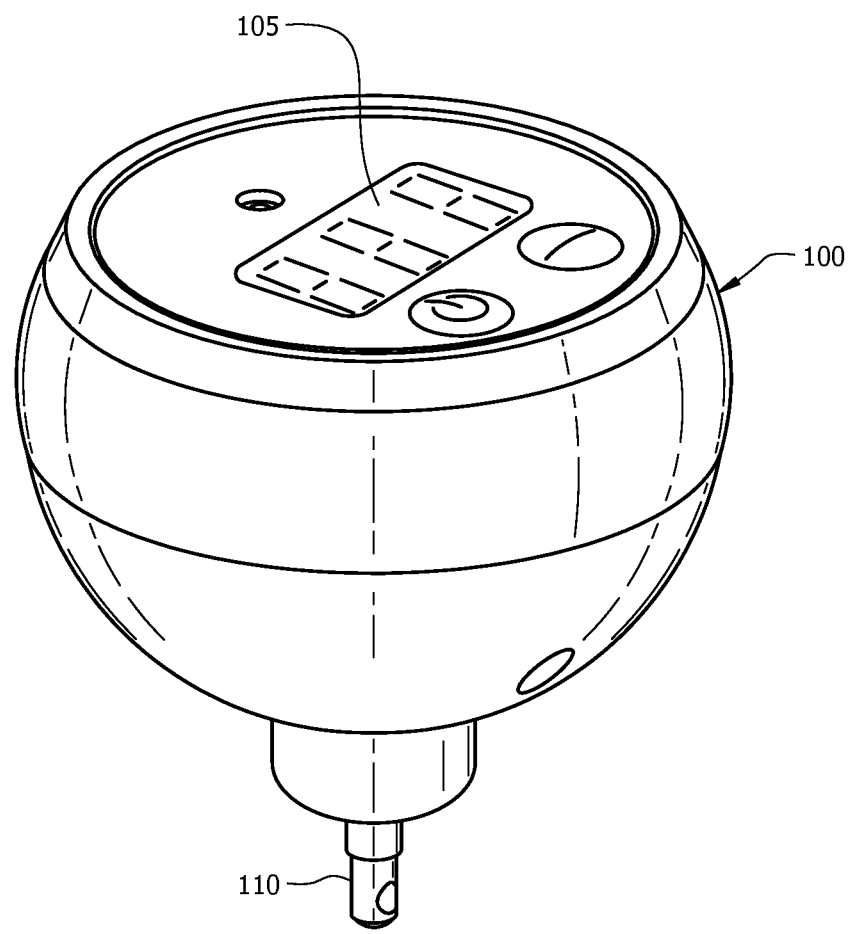
FIG. 1 is a perspective view of one embodiment of the weighing scale of the present invention.

In one embodiment, the present invention comprises a plurality of weighing scales. Each weighing scale functions in harmony with the other weighing scales, providing a user with important information and performing pertinent activities such as, without limitation, at least one of: weighing a fish caught by an angler, displaying the numerical value of the weight of the fish, recording the weight of the fish, determining the fish having the lowest weight out of a group of fish by comparing the weight of each fish in the live well and the weight of a particular fish caught by the angler, and informing the angler of the fish having the lowest weight. With this information, the angler can remove the fish with the lowest weight by tossing it back into the body of water. The weighing scales of the present invention provide the above-mentioned information and perform the above-mentioned activities quickly and without significant interaction by the angler, thereby relieving an angler of performing multiple time-sensitive tasks that divert the angler's attention from catching fish.

Because general rules in most fish culling tournaments dictate that an angler can possess, at most, five fish in a live well at any one time, it is envisioned that, in one embodiment, six weighing scales of the present invention can be utilized by an angler when culling fish—a weighing scale connected to each of the five fish contained in the live well and a weighing scale connected to a sixth fish that is caught. However, it should be understood that other embodiments of the present invention can involve the use of two or more weighing scales at any one time. In one embodiment, if an angler desires to utilize only three weighing scales of the present invention at a given time, the weighing scales present invention will adapt such that only three weighing scales communicate with each other, executing the necessary processes and providing the necessary information to the angler.

After an angler catches a fish and removes it from the water, the angler preferably detaches the fish from the device used to catch the fish, such as a fishing poll or other similar device. In one embodiment of the method of using the weighing scales of the present invention, the fish is then attached to a weighing scale via an attachment mechanism such as, without limitation, a rod or line with a hook on one end. Typically, the fish will be attached by placing the hook into the mouth of the fish. With the fish attached to the weighing scale, the weighing scale is positioned in mid-air, typically by the angler holding the weighing scale in the angler's hand, thereby suspending the fish in mid-air. At that time, the weighing scale measures, reports and records the numerical value of the weight of the fish. If, for example, this fish is one of the first five fish and the angler decides to keep it, the angler will place the fish inside the live well with the weighing scale still attached to the fish.

At the same time, if the angler is using other weighing scales of the present invention, the weighing scale used to weigh the most recently caught fish will communicate, preferably wirelessly, with the other weighing scales currently in use, and determine which weighing scale is attached to the fish with the lowest weight. The weighing scale attached to the fish having the lowest weight alerts the angler, preferably by activating or blinking an LED light indicator positioned thereon. If the angler is at or over the tournament limit, the angler can then detach that particular weighing scale from the fish having the lightest weight, toss that fish back into the body of water, and replace it with a more weighty fish.

Another embodiment of the present invention provides for a plurality of weighing scales that can transmit information to an electronic device that has a user interface, such as, without limitation, a smartphone, personal digital assistant (PDA), computer or other like device. In a preferred embodiment, the user interface of the electronic device is a graphical user interface (GUI). Each weighing scale communicates with an electronics device by transmitting information, such as, without limitation, the weight of a fish, the time that the fish was weighed, the temperature of the water, and the identification and the GPS coordinates of the weighing scale transmitting the information. The electronic device's user interface can permit an application installed thereon to execute a set of instructions which causes the electronic device to record, report, and allow the user to manipulate the information received from each weighing scale.

In one embodiment, the electronic device can receive information from all weighing scales in use and process that information for the benefit of the angler. For example, after the weighing scale has measured the weight of a fish and transmitted that information, along with other pertinent information, to an electronic device, the user interface of the electronic device can report and record the numerical value of the weight of the fish and other information desired by the user. Each weighing scale in use can transmit pertinent information to the electronic device such as, without limitation, its GPS coordinate, its specific identification number, name or code, the weight of the fish attached thereto, time the weight was measured and recorded, and water temperature. The electronic device cannot only identify which weighing scale is attached to the fish having the lowest weight, but it can also provide the angler with additional useful information, such as, without limitation, the total aggregate weight of the fish currently in a live well, the total weight of fish caught during a time period such as for a day, month, or year, and the total weight of fish measured by a particular weighing scale during a specific time period. In one embodiment, the electronic device can link to the Internet, thereby allowing other devices connected to the Internet to view, utilize and manipulate the information transmitted from each weighing scale in use.

In still another embodiment of the present invention, a plurality of weighing scales have the ability to transmit information to a digital display device. Unlike the electronic device discussed above, the digital display device is proprietary in nature and can only communicate with the weighing scales described herein. However, the digital display device can be designed to record and transmit the same information described with respect to the electronic devices described above. Specifically, each weighing scale can communicate with the digital display device by transmitting information such as the weight of a fish, the time that the fish was weighed, the temperature of the water, and the identification and the GPS coordinates of the weighing scale transmitting the information. The digital display device provides the angler with useful information by recording, reporting, and manipulating the received information from each weighing scale. In one embodiment, the digital display device can comprise a screen having multiple partitions, each of which display different pieces of information, such as fish weights, total fish weights, history, time, water temperature.

A further embodiment of the present invention provides for a plurality of weighing scales that can transmit information to a depth or fish finder device using wired or, more preferably, wireless communications technology. In one embodiment, the weighing scales of the present invention communicate wirelessly by sending and receiving electromagnetic wave signals over one or more frequencies in the Industrial, Scientific and Medical (ISM) spectrum band. The ISM band is determined by the International Telecommunication Union, Radiocommunications Sector (ITU-R). ISM frequency bands include those used for wireless local area networks (IEEE 802.11) and Bluetooth devices. Wireless communications systems can also utilize various cellular telephone bands, such as Global System for Mobile Communication (GSM) bands, among others. In a preferred embodiment, the weighing scales communicate with each other or with other electronic devices using the Bluetooth protocol. Bluetooth is an open wireless protocol for exchanging data over short distances from fixed and mobile devices. Bluetooth uses frequency-hopping spread spectrum to split up the data being sent into packets, optionally encrypts the data using at least one encryption algorithm, and transmits the packets on up to 79 frequencies on the 2.4 GHz radio frequency bandwidth. In another preferred embodiment, the weighing scales are Class 2 Bluetooth devices, which gives them a range up to approximately 10 meters.

In one embodiment, each weighing scale can communicate with the fish finder device by transmitting information such as the weight of a fish, the time that the fish was weighed, the temperature of the water, and the identification and the GPS coordinates of the weighing scale transmitting the information. The fish finder device can then convey to the angler the transmitted information.

Figure 10:
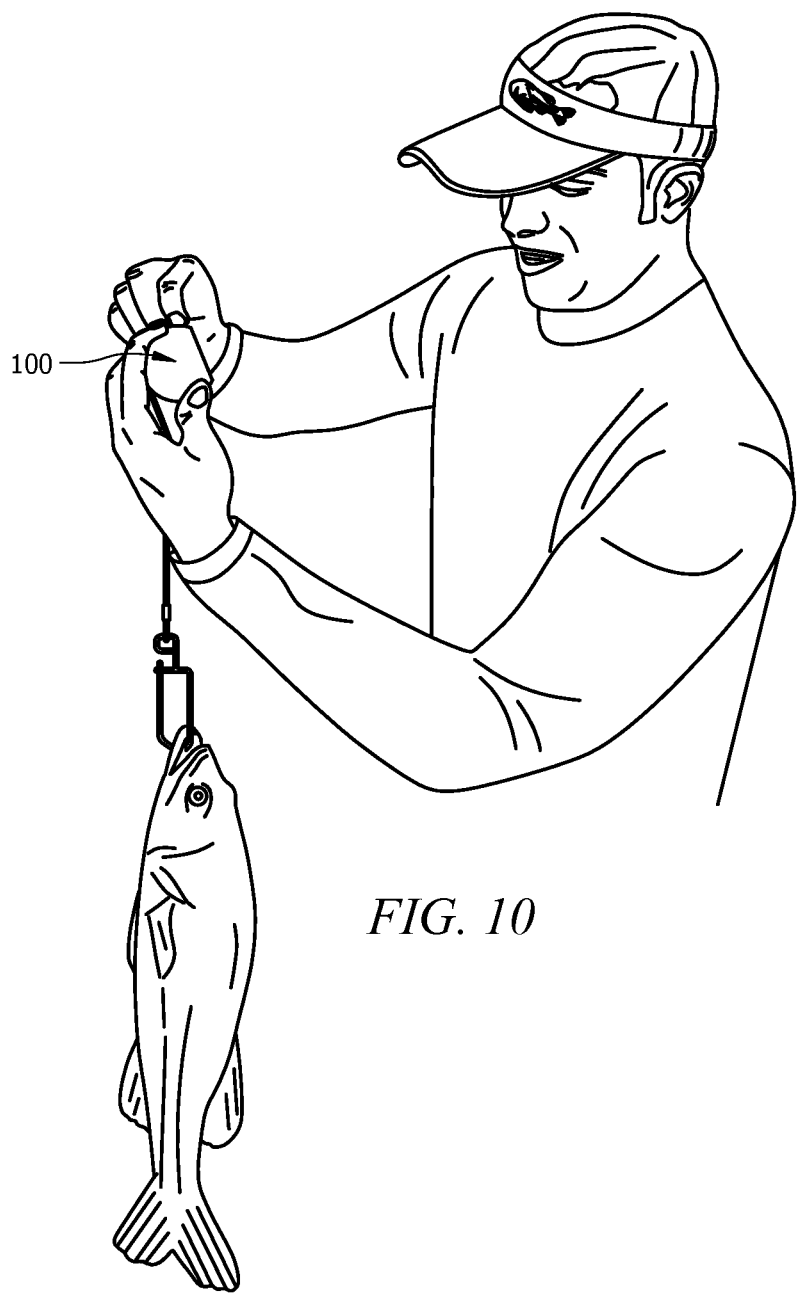
FIG. 10 is a perspective view of an angler utilizing a the weighing scale of the present invention to measure the weight of a fish.

For a better understanding of some of the many possible embodiments of the present invention, drawings are included herewith. In FIG. 1 of the drawings, one embodiment of the weighing scale 100 of present invention is illustrated. At the top of the weighing scale 100 is an LED display 105 for providing information to an angler such as, without limitation, the numerical value of the weight of a fish. It should be noted that, in the broadest sense of the present invention, the weighing scale 100 can be almost any shape or size. The illustrations in the figures should not be construed as limiting. Because, in one embodiment, each weighing scale 100 is designed to float in water, the LED display 105 is positioned at the top of the weighing scale 100 facing upward so that it can easily been seen when the weighing scale 100 is floating. Also, at the bottom of the weighing scale 100 is an attaching member 110 that receives an attachment mechanism for attaching a fish to the weighing scale 100. In a preferred embodiment, the weighing scale further comprises a gripping surface that allows the user to physically hold the weighing scale in the user's hand while weighing the load. In a most preferred embodiment, the gripping surface is curved for ease of handling, as depicted in FIG. 10, and referred to by the reference numeral 135 in FIG. 3.

Figure 2:
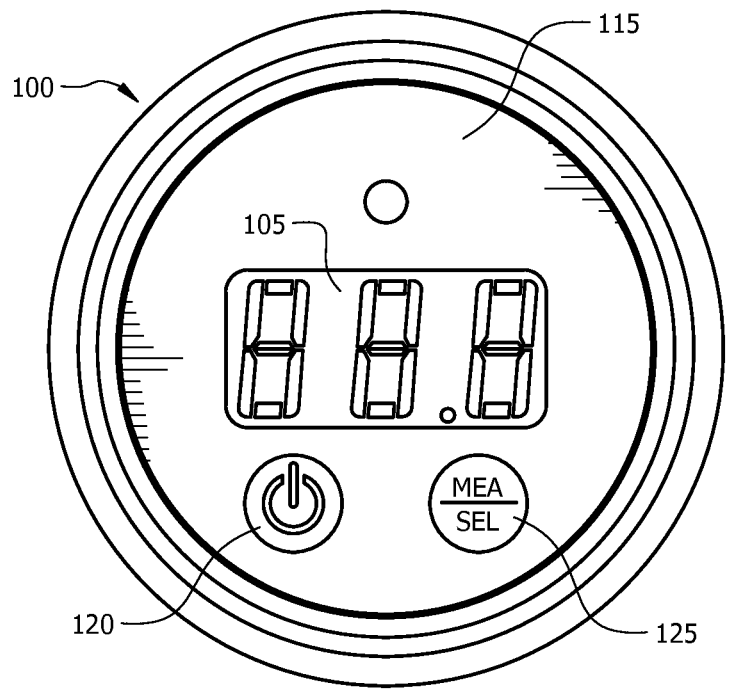
FIG. 2 is a top view of one embodiment of the weighing scale of the present invention.

In reference to FIG. 2, the top portion 115 of the weighing scale 100 is depicted. Positioned on the top portion 115 is the LED display 105, an on/off button 120 for activating and deactivating the weighing scale 100, a weight button 125 which, when pressed, causes the weighing scale 100 to weigh a fish attached to the attachment mechanism of the weighing scale 100, and an LED indicator light 130 that illuminates to alert an angler when the weighing scale 100 is attached to the fish with the lightest weight.

Figure 3:
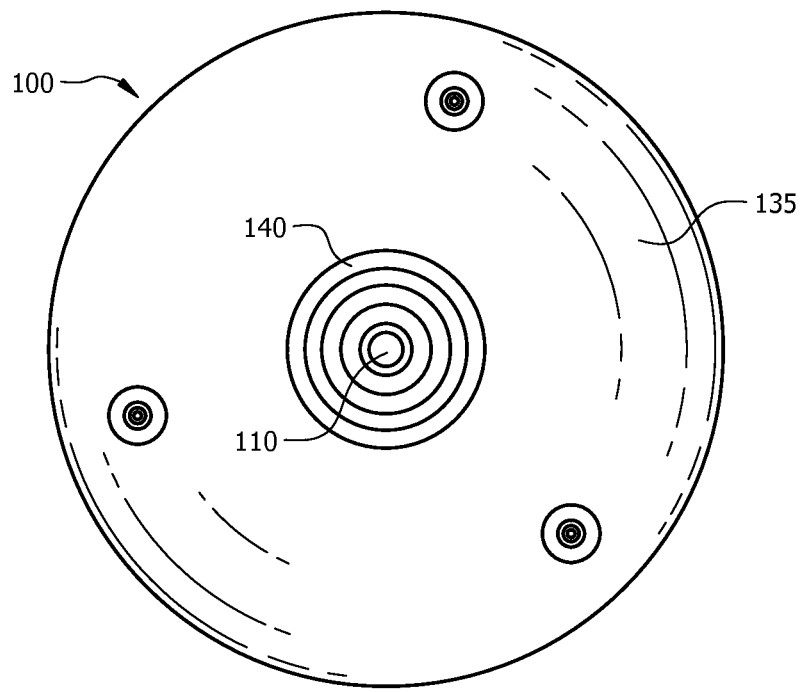
FIG. 3 is a bottom view of one embodiment of the weighing scale of the present invention.
Figure 4:
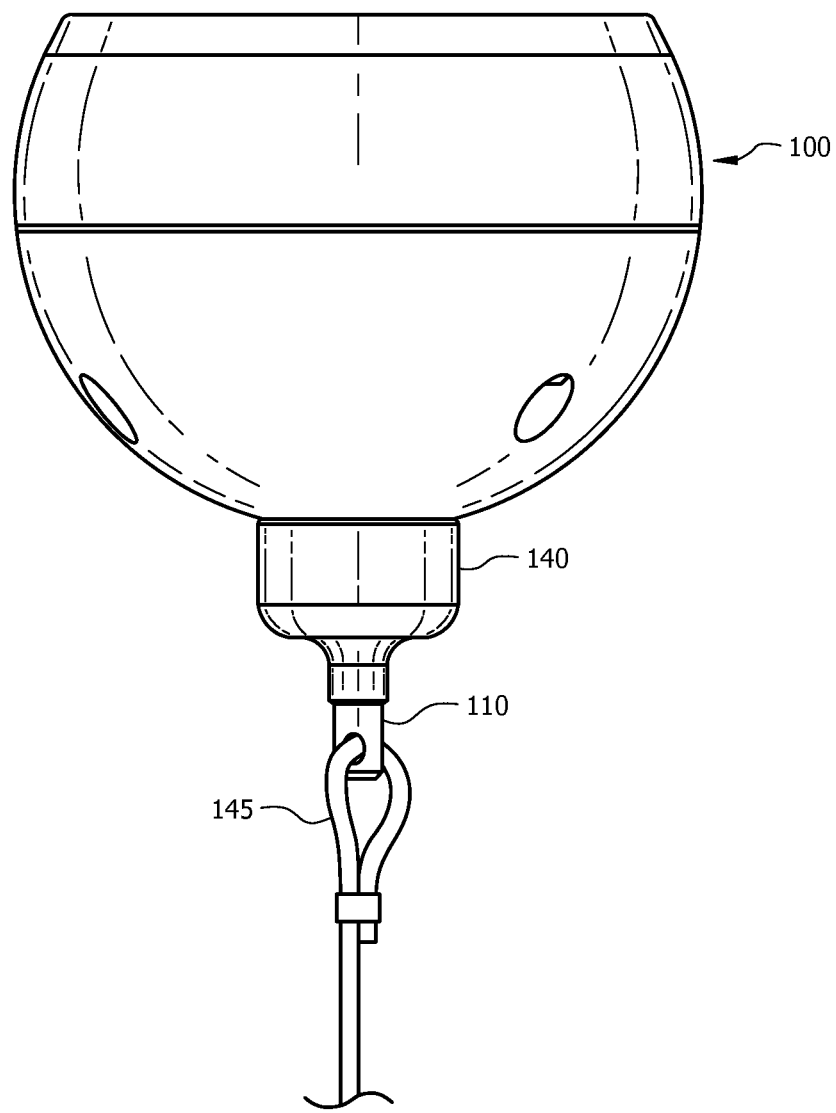
FIG. 4 is a side view of one embodiment of the weighing scale of the present invention engaging an end portion of an attachment mechanism.

FIG. 3 depicts the bottom portion 135 of one embodiment of the weighing scale 100. In this embodiment, the weighing scale 100 comprises a boot 140 to protect and seal the weighing scale 100. The weighing scale also comprises an attaching member 110 which receives the attachment mechanism for attaching a fish to the weighing member 100. FIG. 4 depicts a side view of one embodiment of the weighing scale 100 such that the boot 140 and attaching member 110 are shown. The attaching member 110 is shown receiving a portion of an attachment mechanism 145. For example, the attaching member 110 receives a portion of the attachment mechanism 145 through an aperture that is defined by the attaching member 110, allowing a portion of the attachment mechanism 145 to loop therethrough and secure the attachment mechanism 145 to the weighing scale 100. In an alternative embodiment (not shown), the attaching member is integral to, inseparable from, or serves as, the attachment mechanism.

Figure 5:
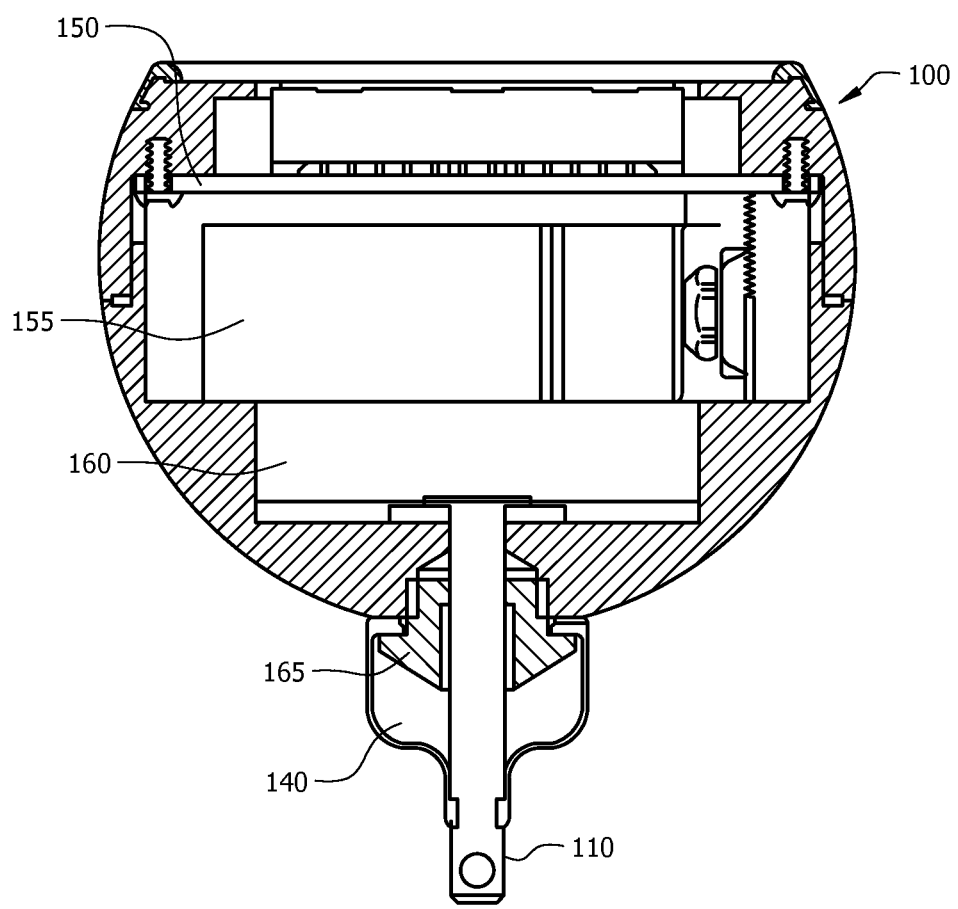
FIG. 5 is a sectional view of one embodiment of the weighing scale of the present invention.

FIG. 5 depicts a section view of one embodiment of the weighing scale 100. In this embodiment, the weighing scale 100 comprises a circuit board 150, a battery 155, foam 160, lower bushing 165, boot 140, and the attaching member 110. This is one example of the structure of a weighing scale 100 with the ability to measure the weight of a fish when such weight is applied to the attaching member 110 via the attachment mechanism 145. The weight of the fish is transferred to the attaching member 110 which causes the above-mentioned parts to react. The circuit board or processing unit 150 measures the reaction and determines the weight which then is displayed via the LED display 105 and/or transmitted to another device such as an electronic device and/or a digital display device. Persons of ordinary skill in this art will appreciate that the weighing scale 100 can comprise one of many different types of internal sensors and equipment to measure the weight of the load on the attaching member.

Figure 6:
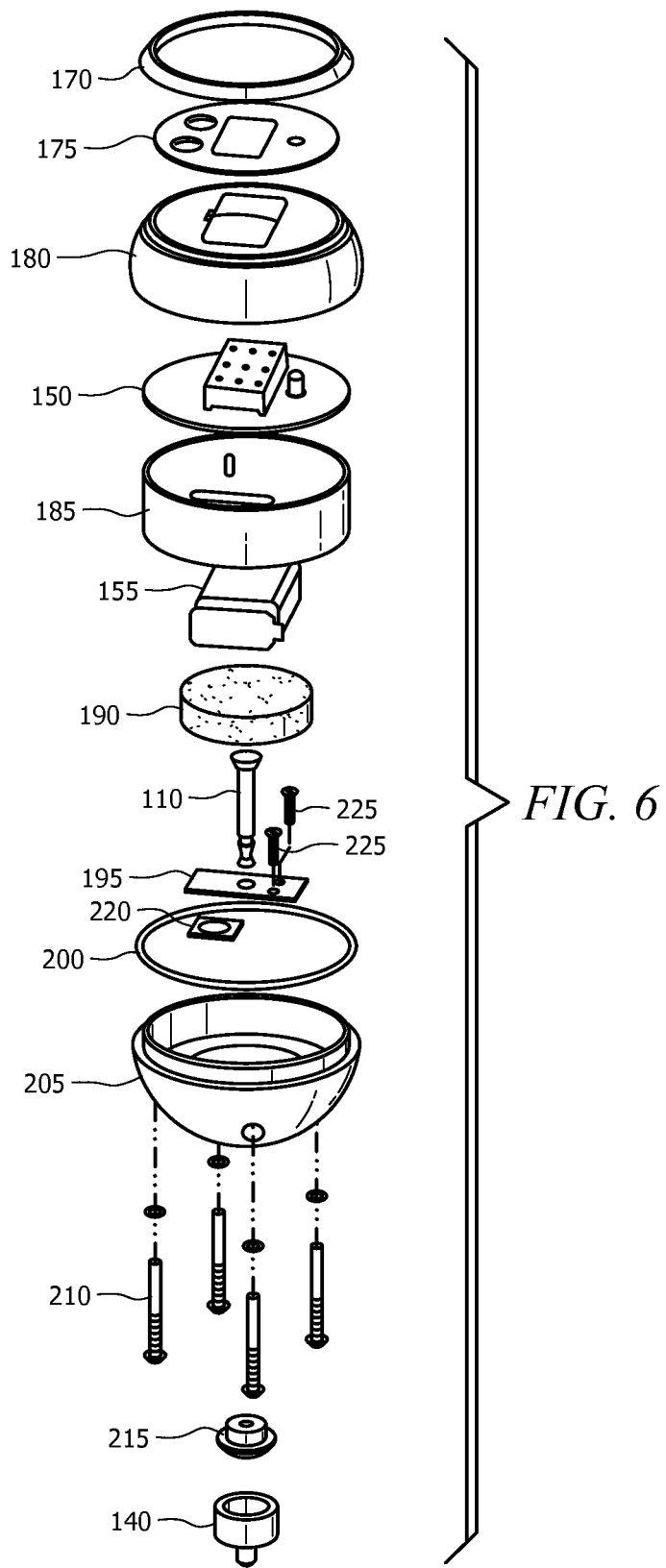
FIG. 6 is an exploded view of the assembly of one embodiment of the weighing scale of the present invention.

FIG. 6 depicts an exploded view of one embodiment of the weighing scale 100 of the present invention. In this embodiment, the weighing scale 100 includes a bezel 170, a membrane switch 175, an upper housing 180, the circuit board 150, an upper foam insert 185, the battery 155, a lower foam insert 190, attaching member 110, weight sensor plate 195, alignment screws 225, piezoelectric pressure sensor 220, rubber o-ring 200, lower housing 205, fasteners 210, lower bushing 215, and the boot 140. In one embodiment the battery 155 can be either replaceable or rechargeable. When the weighing scale is put together, the alignment screws 225 secure one end of the weight sensor plate 195 to one side of the lower housing 205. The piezoelectric pressure sensor 220 is located between the other end of the weight sensor plate 195 and other side of lower housing 205. Attaching member 110 passes through the hole in the weight sensor plate 195 and extends through the lower bushing 215 and boot 140, and out the bottom end of the weighing scale 100. When a load is applied to the attaching member 110, the load is transferred to the weight sensor plate 195, and in turn to the piezoelectric pressure sensor 220. The piezoelectric pressure sensor 220 is designed to register a change in resistance value corresponding to changes in pressure between its upper and lower surfaces, and send that resistance value to the processing unit 150 through at least one wire (not shown). The processing unit 150 reads the resistance value and compares it to an internal look-up table to determine the weight of the load applied to it. The internal look-up table is generated by calibrating the weighing scale using known loads. The processing unit then outputs the weight to the display screen. One skilled in the art will appreciate that other types of weight sensors, and other arrangements of the components shown in FIG. 6 are within the scope of the present invention. In one embodiment, the attaching member 110 is adjoined to the weight sensor plate 195 through a ball and socket joint. In this embodiment, the weight sensor device would tolerate variations in the angle at which it is held when measuring the load weight without giving inaccurate measurements.

If the battery is rechargeable, the weighing scale 100 can be plugged into a device which recharges the battery 155. To facilitate the recharging, the weighing scale 100 can have a port located thereon that allows for the connectivity of a device to recharge the battery 155. In one embodiment, the foam, housings, o-rings and boot help ensure that the weighing scale is substantially water tight—meaning substantially no water penetrates the exterior surfaces of the weighing scale and damages the electrical components inside.

Figure 7:
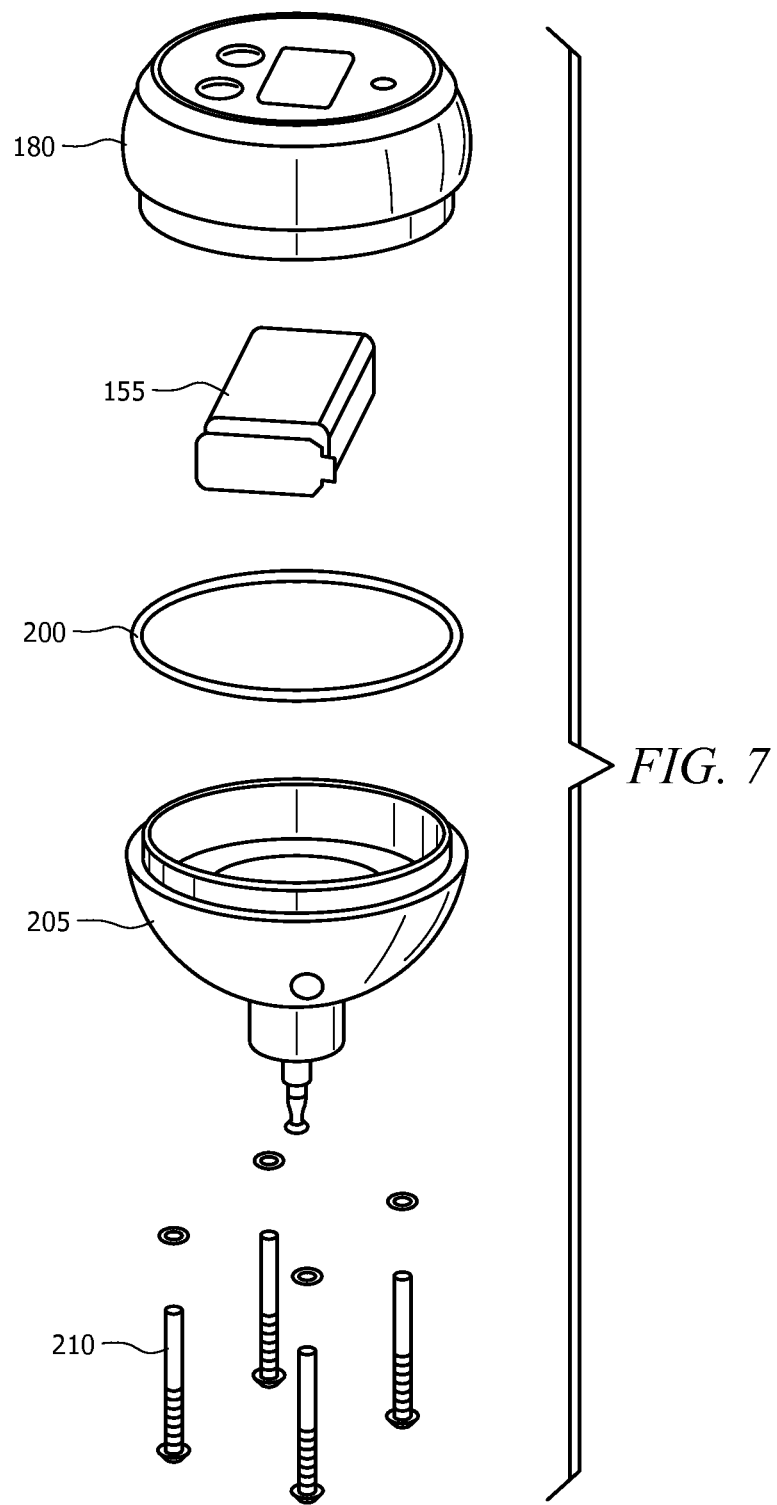
FIG. 7 is another exploded view of the assembly of one embodiment of the weighing scale of the present invention.

FIG. 7 depicts another exploded view of the assembly of the weighing scale 100. In this embodiment, the weighing scale 100 includes the upper housing 180, the battery 155, the rubber o-ring 200, the lower housing 205, and the fasteners 210.

Figure 8:
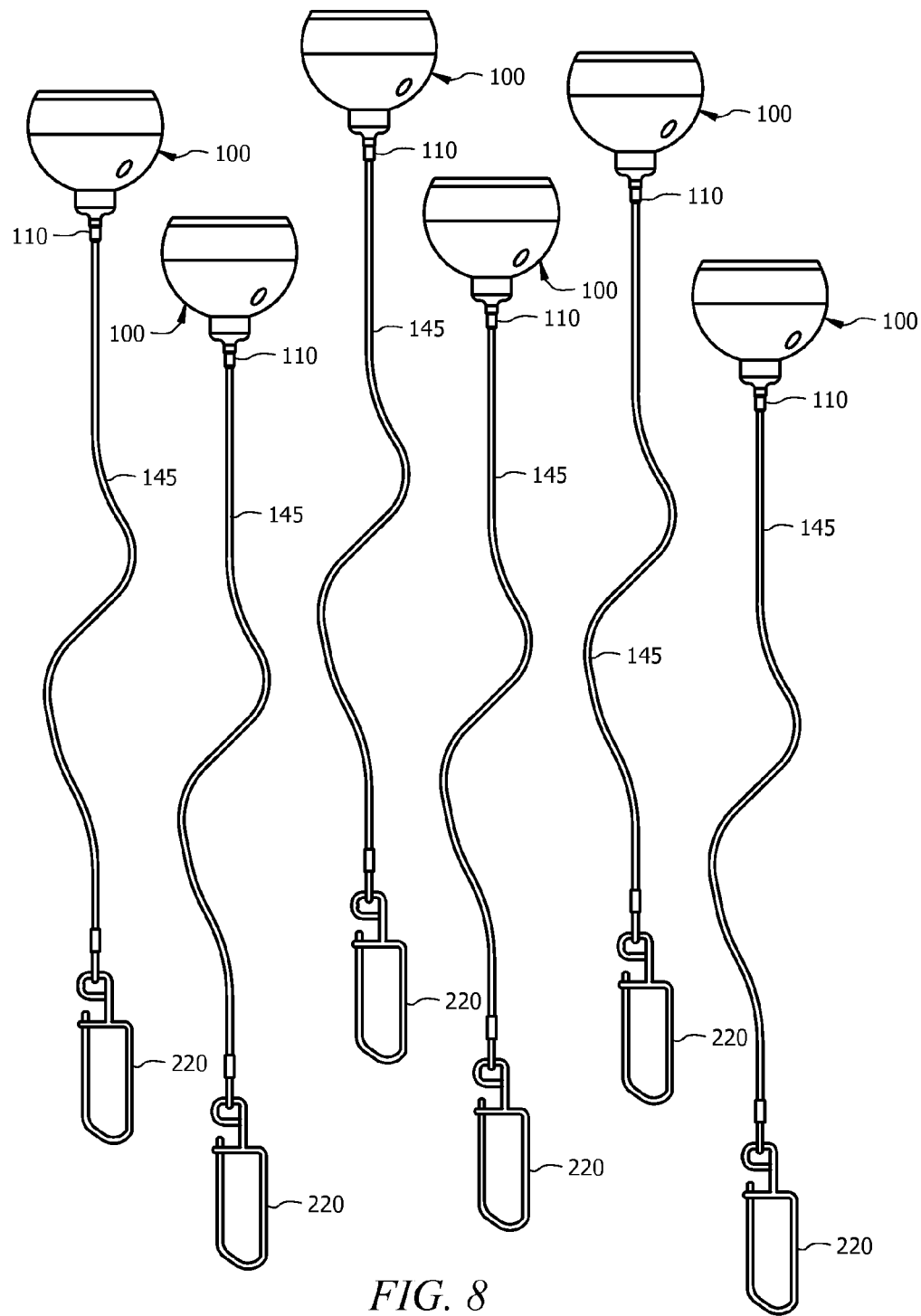
FIG. 8 is a side view of a set of six weighing scales of the present invention, each weight scale having an attachment mechanism attached thereto.

FIG. 8 depicts a set of six weighing scales made according to one embodiment of the present invention. Each weighing scale 100 is attached to an attachment mechanism 145. An end portion of the attachment mechanism 145 comprises a hooking device 220 which hooks into a fish's mouth to secure the fish to the attachment mechanism 145. With the fish secured to the attachment mechanism 145, the fish and weighing 100 can be suspended in mid-air, thereby allowing the weight of the fish to be transferred to the attaching member 110 of the weighing scale 100.

Figure 9:
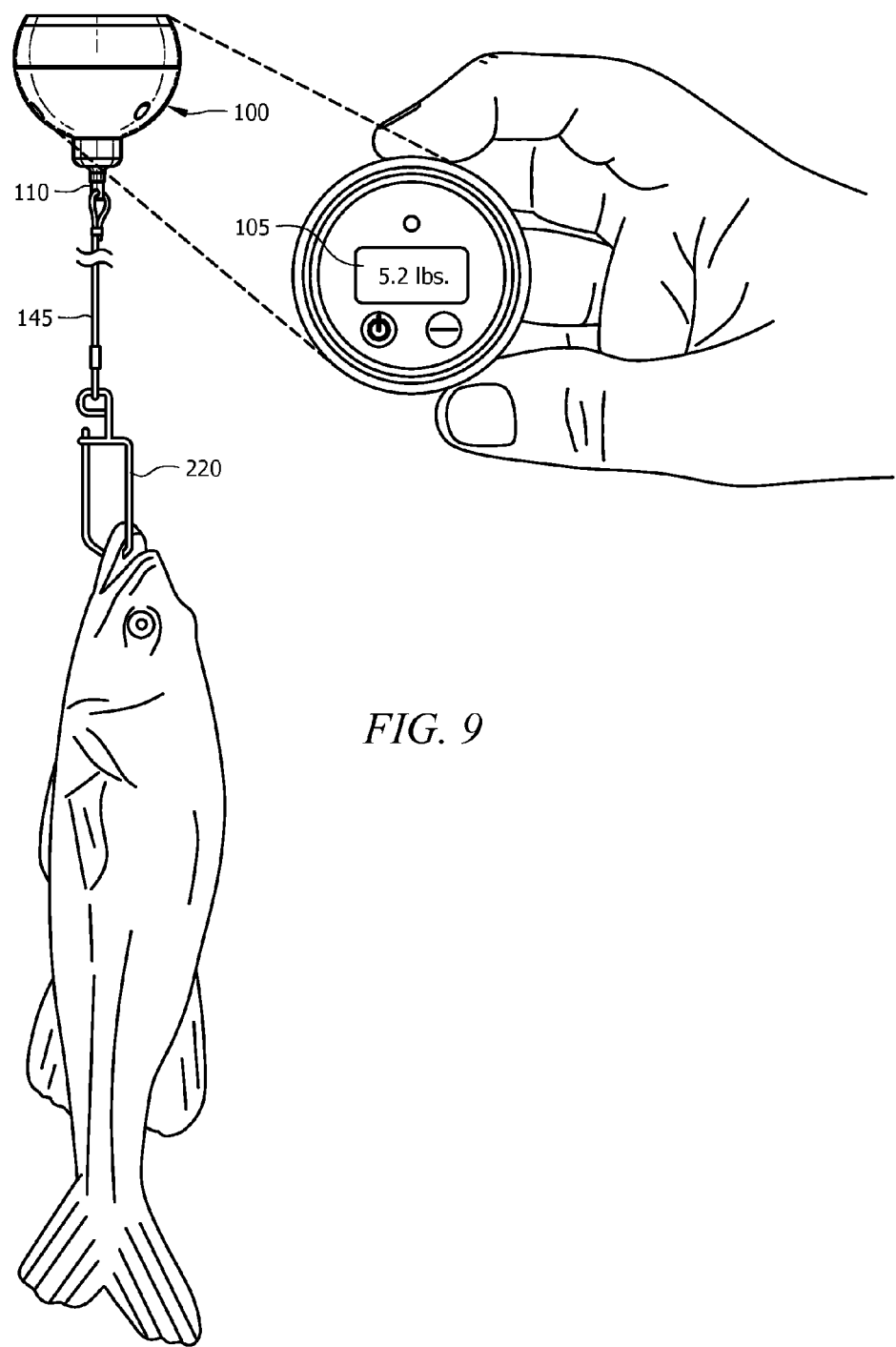
FIG. 9 is a side view of one embodiment of the weighing scale of the present invention, and fish suspended in mid-air, thereby allowing the weighing scale to measure the weight of the fish.

FIG. 9 depicts the hooking device 220 of the attachment mechanism 145 hooked into a fish's mouth and the other end thereof attached to the attachment member 110 of the weighing scale 100. As shown, the fish is suspended in mid-air and the weighing scale 100 has measured the weight of the fish and is displaying the numerical value of the fish's weight via the LED Display 105. FIG. 10 depicts an angler holding one embodiment of the weighing scale 100 and suspending a fish attached thereto in mid-air to weigh the fish.

Figure 11:
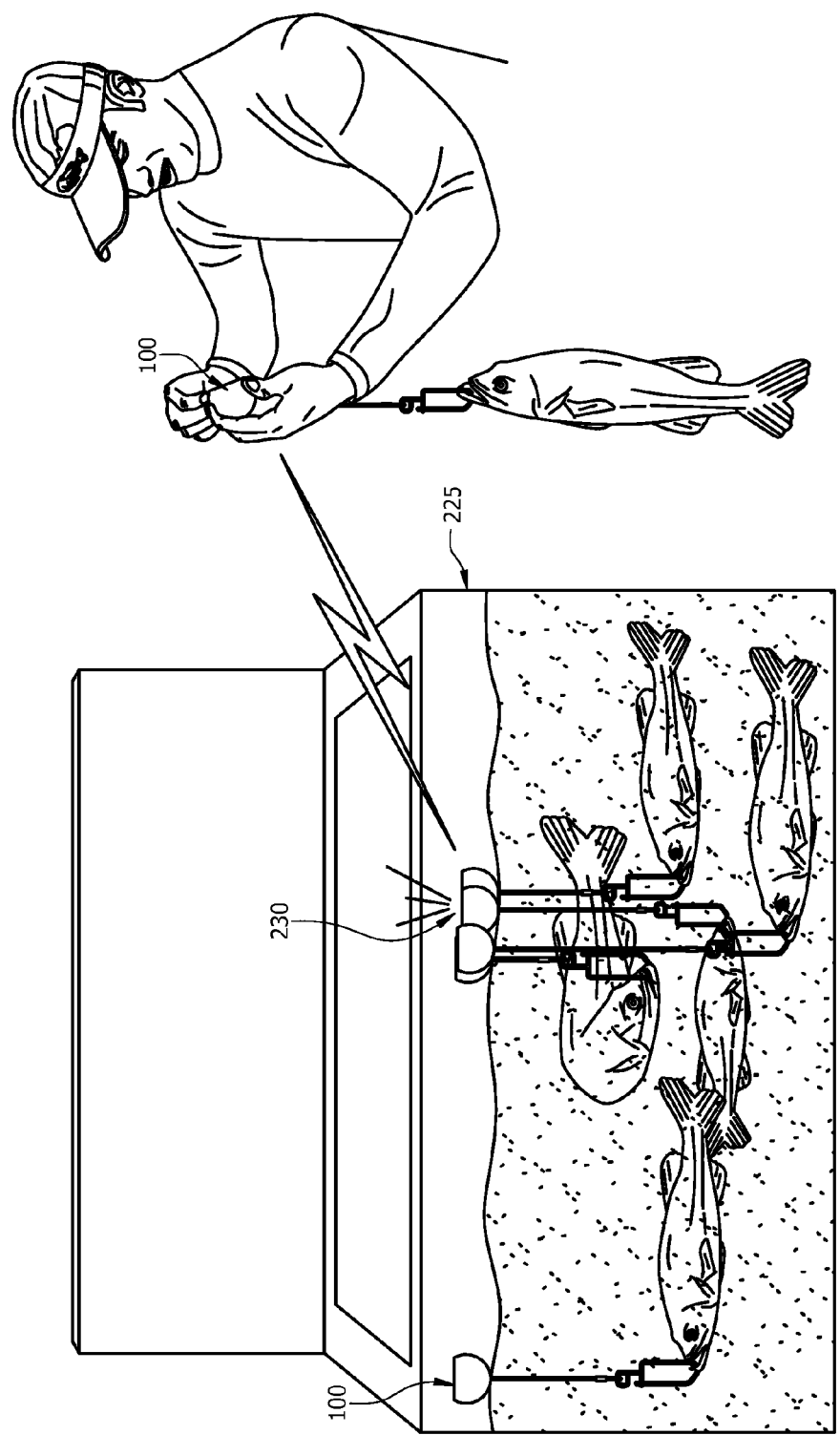
FIG. 11 is a side view of a plurality of weighing scales located inside a live well and a weighing scale held by an angler such that the weighing scale held by the Angler has measured the weight of a fish and has communicated via electronic transmission with the plurality of weighing scales located inside the live well and a weighing scale located inside the live well has alerted the angler via an LED indicator light thereon that the fish attached thereto is the least weightiest fish.
Figure 12:
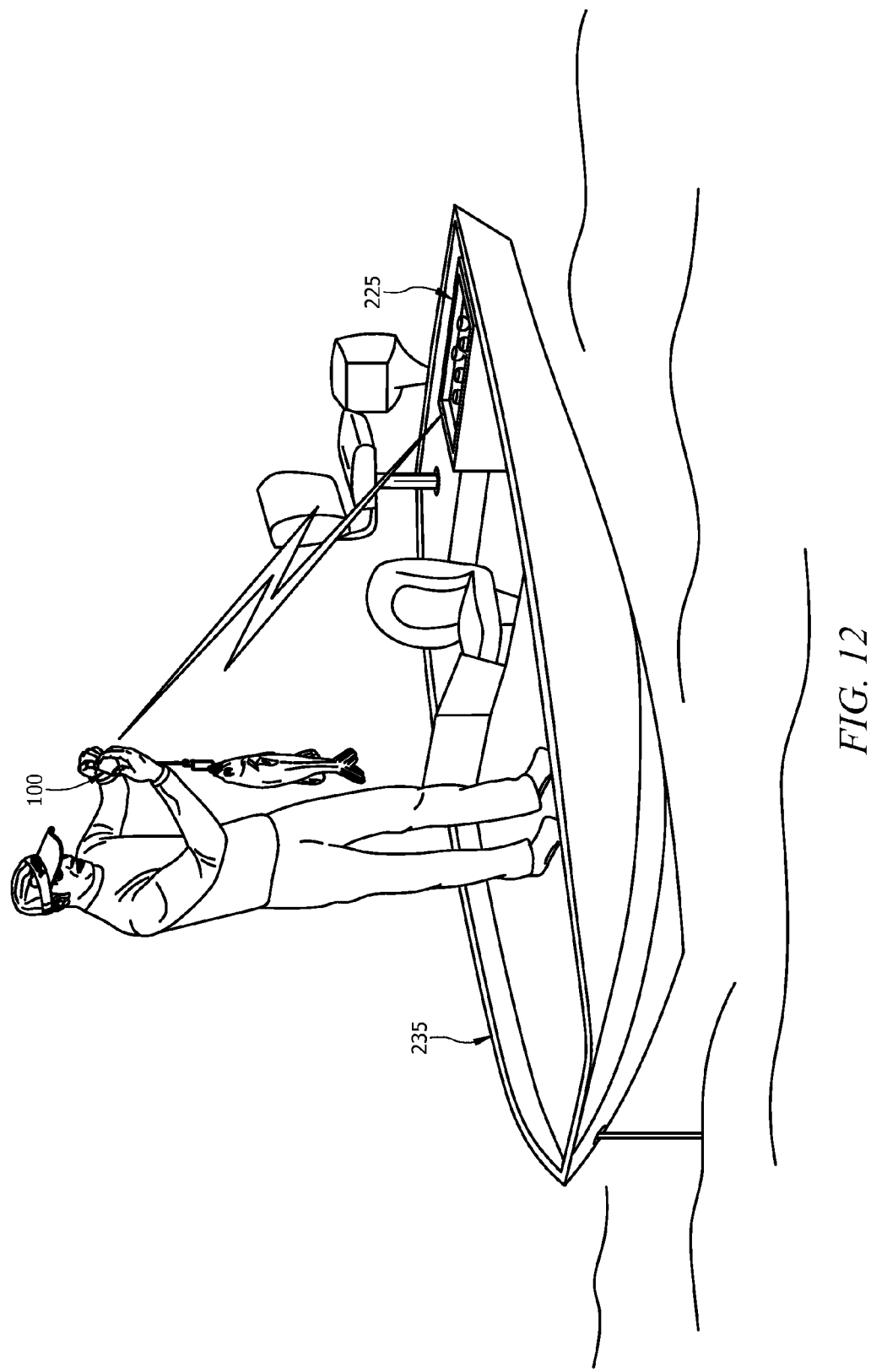
FIG. 12 is a perspective view of a plurality of weighing scales located inside a live well and a weighing scale held by an angler such that the weighing scale held by the angler has measured the weight of a fish and is communicating via electronic transmission with the plurality of weighing scales located inside the live well.

FIG. 11 depicts a live well 225 containing several fish such that each fish is attached to a weighing scale 100 that is floating on the water in the live well 225. Furthermore, an angler is also depicted suspending a fish and measuring its weight with a weighing scale 100. The LED indictor light on a weighing scale 100 located within the live well 225 has illuminated 230, alerting the angler of the weighing scale having the fish with the lowest weight attached thereto. FIG. 12 depicts a live well 225 located within a boat 235. The angler depicted there is utilizing a weighing scale 100 to measure the weight of a fish. Once the weight of the fish is determined, the weighing scale attached to the fish having the lowest weight will alert the angler. That specific fish can then be quickly and efficiently culled from the group.

Figure 13:
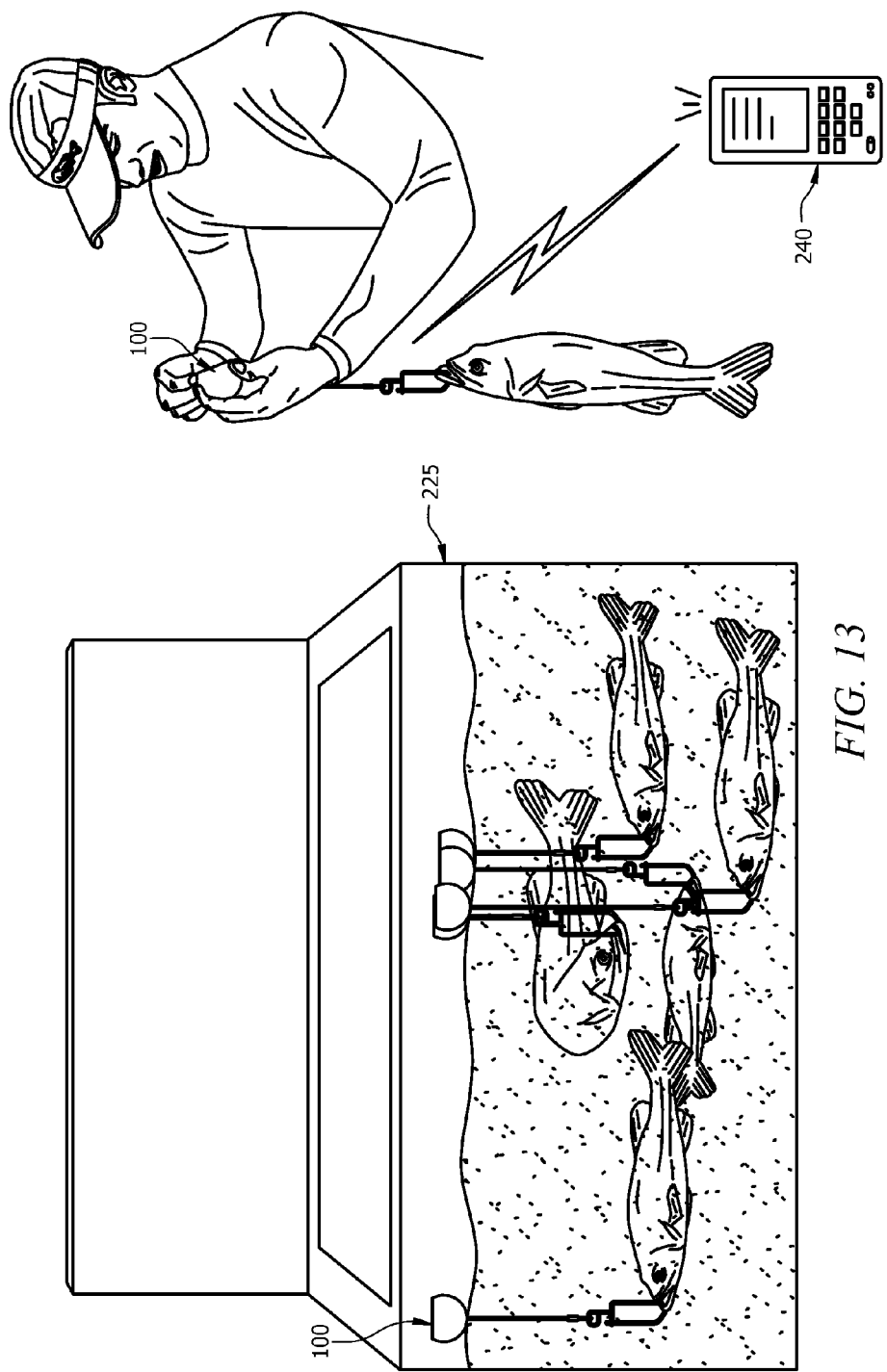
FIG. 13 is a side view of a plurality of weighing scales located inside a live well and a weighing scale held by an angler such that the weighing scale held by the angler has measured the weight of a fish and is communicating via electronic transmission to a digital display device which receives information from each weighing scale and determines which weighing scale is attached to the least weightiest fish.

FIG. 13 depicts another embodiment of the present invention wherein each weighing scale 100 communicates with a digital display device 240. The digital display device 240 collects information from each weighing scale 100 via electronic transmission and records, manipulates and reports the information, thereby providing an angler with such information as the weight of a fish attached to each weighing scale 100, the time that the fish was weighed, the temperature of the water, and the identification and the GPS coordinates of the weighing scale transmitting the information. Furthermore, the digital display device 240 notifies the angler which weighing scale is attached to the fish having the lowest weight, thus allowing the angler to quickly and efficiently cull that specific fish.

In another embodiment of the present invention, each weighing scale communicates with an electronic device such as, without limitation, a smart phone. A software application running on the electronic device also provides an angler with information received from the weighing scale, for example and without limitation, the specific weighing scale that is attached to the fish having the lowest weight.

Figure 14:
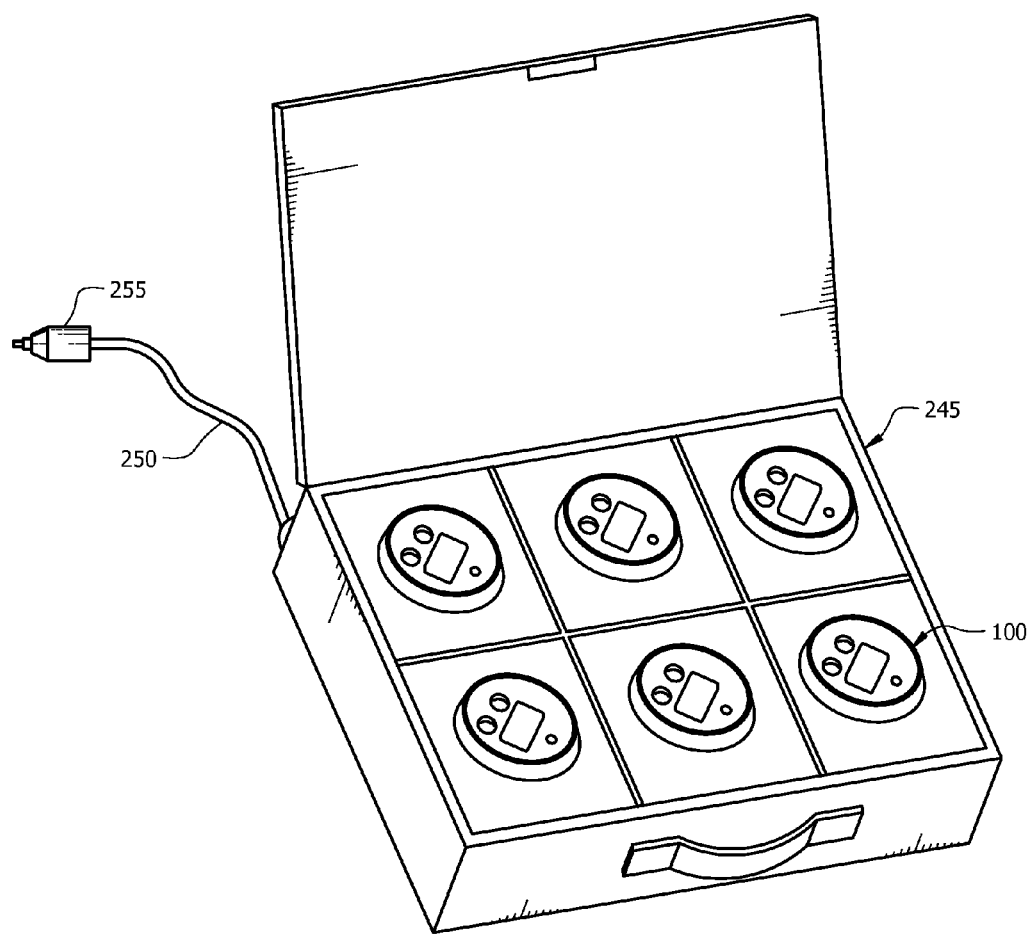
FIG. 14 is a perspective view of a carrying case having partitioned areas for receiving weighing scales wherein the carrying case both stores weighing scales and recharges the battery of each weighing scale when the carrying case is plugged into a power source.

FIG. 14 depicts a case 245 that can be used to store and recharge a plurality of weighing scales. The case 245 comprises a plurality of partitions receiving a plurality of weighing scales. Each partitioned area receives a weighing scale. Once inserted, the weighing scale 100 makes contact with a recharging socket, thereby allowing the battery of the weighing scale to recharge. The case 245 comprises a power cord 250 that can plug into a power source. For example, the end 245 of the power cord 250 can comprise a cigarette lighter connector 255 that can connect into a cigarette lighter receptacle in an automobile or other vehicle.

Although the many embodiments of the present invention have been illustrated in the accompanying Drawings and described in the foregoing Detailed Description, it should be understood that the present invention is not limited to the embodiments disclosed, but is capable of numerous rearrangements, modifications, and substitutions of parts and elements without departing from the spirit and scope of the invention.

What is claimed is:

1. A weighing system comprising:
a plurality of weighing scales, wherein each weighing scale comprises a weight sensor that measures the weight of a load attached thereto, further wherein each weighing scale comprises an indicator light that alerts a user of said plurality of weighing scales when the load attached thereto is lower in weight than every other load attached to every other weighing scale in use by said user, wherein each weighing scale communicates wirelessly with every other weighing scale in use by said user, determines which weighing scale in use is attached to the load having the lowest weight, and alerting the user when the load attached thereto is lower in weight than all other loads.

2. The weighing system of claim 1 wherein each said weighing scale comprises a display screen.

3. The weighing system of claim 1 wherein said weighing scales are capable of communicating with an electronic device.

4. The weighing system of claim 3 wherein said electronic device is chosen from the group consisting of a mobile telephone, a personal digital assistant, a digital display device, a computer, a depth finder, and a fish finder.

5. A weighing scale comprising a gripping surface, an attachment member capable of receiving a load, and a weight sensor capable of measuring a weight for said load, wherein said weighing scale is buoyant in water, communicates wirelessly with other weighing scales currently in use by a user, and alerts said user when a load attached thereto is lower in weight than all loads attached to said other weighing scales.

6. The weighing scale of claim 5 further comprising a display screen.

7. The weighing scale of claim 5 further comprising an indicator light.

8. The weighing scale of claim 5 further comprising a battery.

9. The weighing scale of claim 8 further comprising a rechargeable battery.

10. The weighing scale of claim 5 wherein said weighing scale is substantially water tight.

11. The weighing scale of claim 5 wherein said weight sensor comprises a piezoelectric pressure sensor mechanically connected to a weight sensor plate and electrically connected to a processing unit, wherein said piezoelectric pressure sensor sends a resistance value signal to said processing unit in response to said load, and wherein said processing unit compares said resistance value to a look-up table to determine said weight.

* * * * *